(12) United States Patent
Hasan et al.

(10) Patent No.: US 8,378,603 B2
(45) Date of Patent: Feb. 19, 2013

(54) METHOD AND SYSTEM FOR CONTROLLING AN ELECTRIC MOTOR USING ZERO CURRENT OFFSET VALUE CANCELLATION

(75) Inventors: S. M. N. Hasan, Novi, MI (US); Brian A. Welchko, Torrance, CA (US); David P. Tasky, Farmington Hills, MI (US); Justin O. Nielsen, Redondo Beach, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 479 days.

(21) Appl. No.: 12/687,496

(22) Filed: Jan. 14, 2010

(65) Prior Publication Data

US 2011/0169438 A1    Jul. 14, 2011

(51) Int. Cl.
*H02P 1/04* (2006.01)
(52) U.S. Cl. ............... 318/400.09; 318/400.32; 318/432
(58) Field of Classification Search ............ 318/400.01, 318/400.02, 400.23, 432, 568.22, 572, 701, 318/721, 799, 801, 727, 400.09, 400.32; 363/45
See application file for complete search history.

(56) References Cited

U.S. PATENT DOCUMENTS

| | | | | |
|---|---|---|---|---|
| 5,708,337 A * | 1/1998 | Breit et al. | | 318/400.09 |
| 5,796,228 A | 8/1998 | Kojima et al. | | |
| 5,841,263 A | 11/1998 | Kaneko et al. | | |
| 6,259,226 B1 * | 7/2001 | Kaitani et al. | | 318/798 |
| 7,511,448 B2 | 3/2009 | Terada et al. | | |
| 7,518,325 B2 * | 4/2009 | Odland et al. | | 318/280 |
| 7,604,088 B2 * | 10/2009 | Nishizaki et al. | | 180/446 |

OTHER PUBLICATIONS

Chinese Patent and Trademark Office. China Office Action dated Oct. 10, 2012 for Patent Application No. 201110007407.3.

* cited by examiner

*Primary Examiner* — Antony M Paul
(74) *Attorney, Agent, or Firm* — Ingrassia Fisher & Lorenz, P.C.

(57) ABSTRACT

Methods and systems for controlling an electric motor are provided. The electric motor includes at least one winding. A winding current flowing through the at least one winding is monitored. The winding current has an oscillating component and an offset component. The offset component of the winding current is isolated from the oscillating component of the winding current. The electric motor is controlled based on the offset component of the winding current.

18 Claims, 3 Drawing Sheets

METHOD AND SYSTEM FOR CONTROLLING AN ELECTRIC MOTOR USING ZERO CURRENT OFFSET VALUE CANCELLATION

TECHNICAL FIELD

The present invention generally relates to electric motors. More specifically, the present invention relates to a method and system for controlling an electric motor, such as an electric motor used in a propulsion system of an automobile.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries, perhaps in combination with another actuator, to drive the wheels.

Such vehicles often use two separate voltage sources, such as a battery and a fuel cell, to power the electric motors that drive the wheels. Power electronics (or power electronics systems), such as direct current-to-direct current (DC/DC) converters, are typically used to manage and transfer the power from the two voltage sources. Also, due to the fact that alternative fuel automobiles typically include only direct current (DC) power supplies, direct current-to-alternating current (DC/AC) inverters (or power inverters) are also provided to convert the DC power to alternating current (AC) power, which is generally required by the motors.

An important component in the control of power electronics is feedback provided by current sensors which indicate the amount of current actually flowing through the windings in the electric motor, as this feedback is used to optimize efficiency and torque regulation. Any errors associated with the current sensor interface significantly impacts torque regulation. Additionally, Hall Effect Sensors are sometimes used as these current sensors and often experience linearity error, output accuracy error, hysteresis error, and zero current error. Zero current offset may account for a significant portion of the total current sensing error and may be the result of offset from the sensors, circuit interface offset, power supply offset, analog-to-digital channel offset, operating temperature changes, and external noise.

Accordingly, it is desirable to provide an improved system and method for controlling an electric motor which provides at least partially cancellation of such current sensing errors. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for controlling an electric motor is provided. The electric motor includes at least one winding. A winding current flowing through the at least one winding is monitored. The winding current has an oscillating component and an offset component. The offset component of the winding current is isolated from the oscillating component of the winding current. The electric motor is controlled based on the offset component of the winding current.

A method for controlling an automotive electric motor is provided. The automotive electric motor includes a plurality of windings. A plurality of winding currents are monitored. Each of the plurality of winding currents flows through a respective one of the plurality of windings. A plurality of winding current signals are generated. Each of the plurality of winding signals is representative of a respective one of the plurality of winding currents and is a sum of an oscillating component and an offset component. The plurality of winding current signals are filtered to determine the offset component of each of the plurality of winding current signals. The automotive electric motor is controlled based on the offset components of the plurality of winding current signals.

An automotive propulsion system is provided. The automotive propulsion system includes an electric motor having at least one winding, a direct current (DC) voltage supply coupled to the electric motor, a current sensor coupled to the at least one winding configured to generate a signal representative of a winding current flowing through the at least one winding, a power inverter having at least one power switching device coupled to the at least one winding and the DC voltage supply, and a processor in operable communication with the electric motor, the DC voltage supply, the current sensor and the power inverter. The processor is configured to monitor the winding current flowing through the at least one winding, wherein the winding current has an oscillating component and an offset component, isolate the offset component of the winding current from the oscillating component of the winding current; and control the at least one power switching device based on the offset component of the winding current.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-4 are merely illustrative and may not be drawn to scale.

FIG. 1 to FIG. 4 illustrate systems and methods for controlling an electric motor. The electric motor includes at least one winding. A winding current flowing through the at least one winding is monitored. The winding current has an oscillating component and an offset component. The offset component of the winding current is isolated from the oscillating component of the winding current. The electric motor is controlled based on the offset component of the winding current, except at low output frequency where the frequency of oscillations is low, and the offset current cannot be separated from the oscillating component of the winding current in a timely manner. The electric motor may be an automotive electric motor installed in an automotive propulsion system. The isolation of the offset component of the winding current may be performed with a low pass filter with a cut off frequency that is greater than a frequency of the offset component and less than a frequency of the oscillating component.

Figure 1:
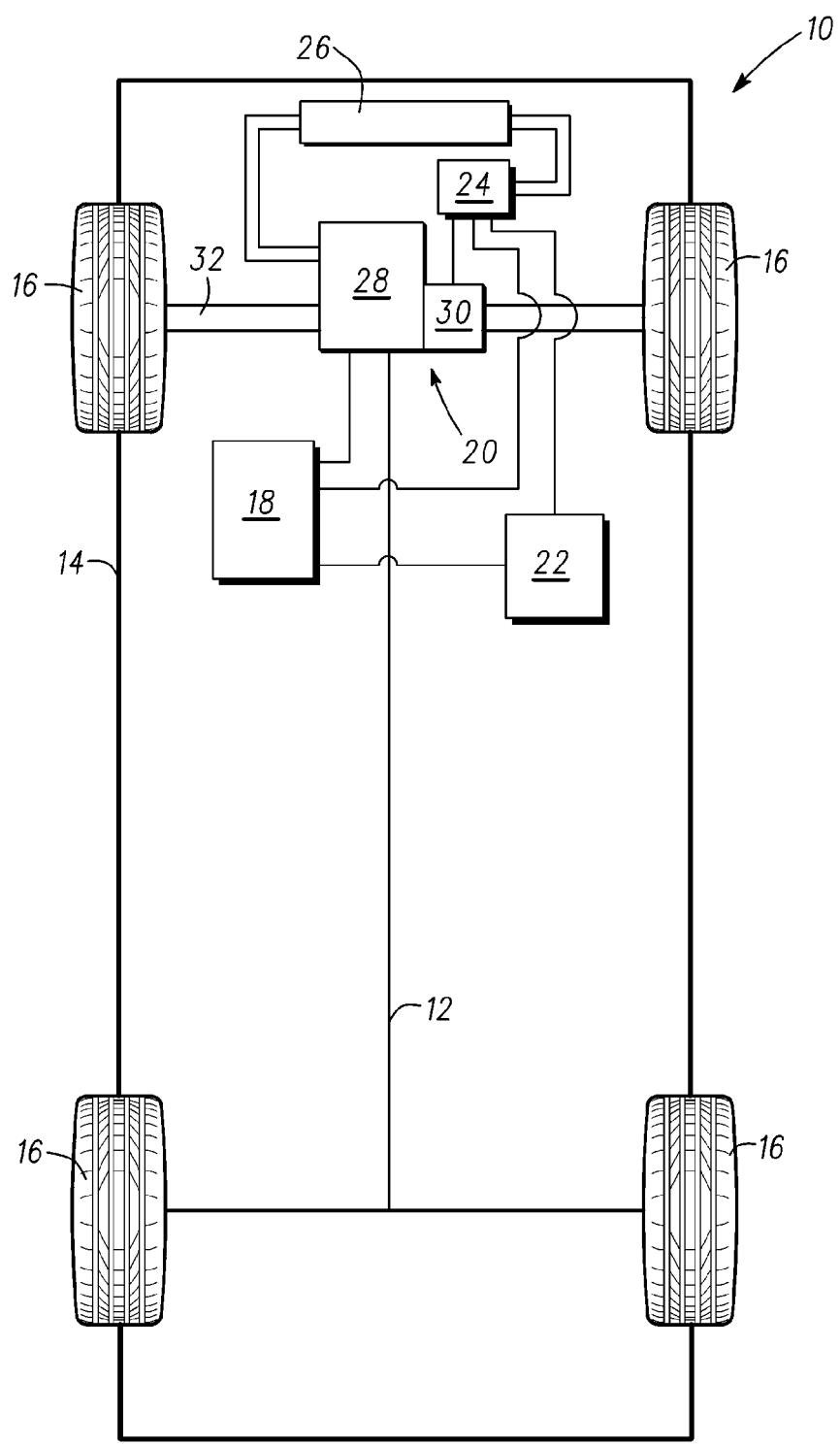
FIG. 1 is a schematic view of an exemplary automobile according to one embodiment of the present invention.

FIG. 1 illustrates a vehicle (or "automobile") 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the automobile 10 is an HEV, and further includes an actuator assembly 20, a battery (or a DC power or voltage supply) 22, a power electronics assembly (e.g., an inverter or inverter assembly) 24, and a radiator 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In one embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 28 and the inverter 24.

Referring again to FIG. 1, in the depicted embodiment, the inverter 24 receives and shares coolant with the electric motor 30. However, other embodiments may use separate coolants for the inverter 24 and the electric motor 30. The radiator 26 may be similarly connected to the inverter 24 and/or the electric motor 30.

The electronic control system 18 is in operable communication with the actuator assembly 20, the high voltage battery 22, and the inverter 24. Although not shown in detail, the electronic control system 18 includes various sensors and automotive control modules, or electronic control units (ECUs), such as an inverter control module, a motor controller, and a vehicle controller, and at least one processor (or processing system) and/or a memory having instructions stored thereon (or in another computer-readable medium) for carrying out the processes and methods as described below.

Figure 2:
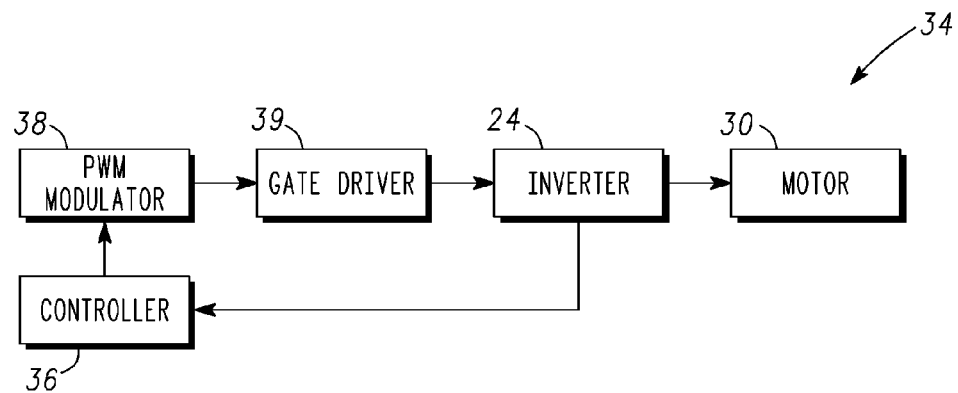
FIG. 2 is a block diagram of an inverter system within the automobile of FIG. 1.

Referring to FIG. 2, an inverter control system (or electric drive system) 34, in accordance with an exemplary embodiment of the present invention, is shown. The voltage source inverter system 34 includes a controller 36 in operable communication with a Pulse Width Modulation (PWM) modulator 38 (or a pulse width modulator) and the inverter 24 (at an output thereof). The PWM modulator 38 is coupled to a gate driver 39, which in turn has an output coupled to an input of the inverter 24. The inverter 24 has a second output coupled to the motor 30. The controller 36 and the PWM modulator 38 may be integral with the electronic control system 18 shown in FIG. 1.

Figure 3:
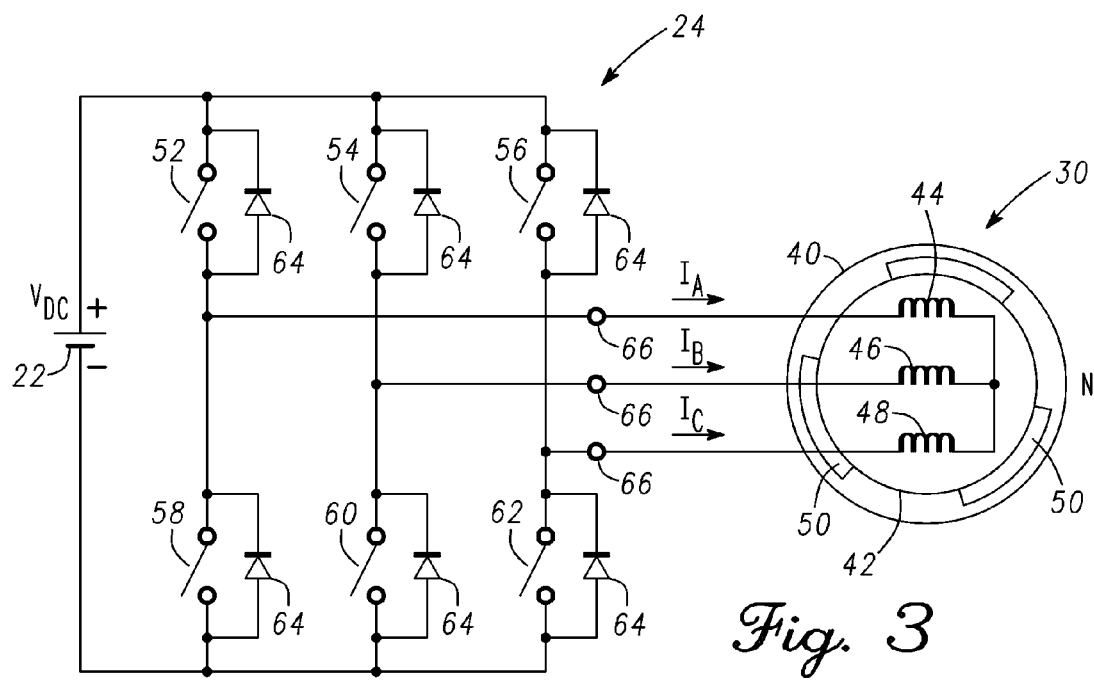
FIG. 3 is a schematic view of a power inverter, a voltage supply, and an electric motor within the automobile of FIG. 1.

FIG. 3 schematically illustrates the battery (and/or DC voltage source) 22, the inverter 24 (or power converter), and the motor 30 of FIGS. 1 and 2 in greater detail. The inverter 24 includes a three-phase circuit coupled to the motor 30. More specifically, the inverter 24 includes a switch network having a first input coupled to the battery 22 (i.e., a voltage source ($V_{DC}$)) and an output coupled to the motor 30. Although a single voltage source is shown, a distributed DC link with two or more series sources may be used.

As will be appreciated by one skilled in the art, the electric motor 30, in one embodiment, is a permanent magnet electric motor and includes a stator assembly 40 (including conductive coils or windings) and a rotor assembly 42 (including a ferromagnetic core and/or magnets), as well as a transmission and a cooling fluid (not shown). The stator assembly 40 includes a plurality (e.g., three) conductive coils or windings 44, 46, and 48, each of which is associated with one of three phases of the electric motor 30, as is commonly understood. The rotor assembly 42 includes a plurality of magnets 50 and is rotatably coupled to the stator assembly 40, as is commonly understood. The magnets 50 may include multiple electromagnetic poles (e.g., sixteen poles), as is commonly understood. It should be understood that the description provided above is intended as example of one type of electric motor that may be used.

The switch network comprises three pairs (a, b, and c) of series power switches devices (or switches) with antiparallel diodes (i.e., antiparallel to each switch) corresponding to each of the phases of the motor 30. Each of the pairs of series switches comprises a first switch, or transistor, (i.e., a "high" switch) 52, 54, and 56 having a first terminal coupled to a positive electrode of the voltage source 22 and a second switch (i.e., a "low" switch) 58, 60, and 62 having a second terminal coupled to a negative electrode of the voltage source 22 and a first terminal coupled to a second terminal of the respective first switch 52, 54, and 56.

As is commonly understood, each of the switches 52-62 may be in the form of individual semiconductor devices such as insulated gate bipolar transistors (IGBTs) within integrated circuits formed on semiconductor (e.g. silicon) substrates (e.g., die). As shown, a diode 64 is connected in an antiparallel configuration (i.e., a "flyback" or "freewheeling" diode) to each of the switches 52-62. As such, each of the switches 52-62 and the respective diode 64 may be understood to form a switch-diode pair or set, six of which are included in the embodiment shown.

Still referring to FIG. 3, the inverter 24 and/or the motor 30 includes a plurality of current sensors 66, each of which is configured to detect the flow of current through a respective one of the windings 44, 46, and 48 of the motor 30 (and/or through the respective switches 52-62 or diodes 64). In one embodiment, the current sensors 66 are Hall Effect sensors. Other examples of current sensors include resistive shunt type sensors and magneto-resistive type sensors.

During normal operation (i.e., driving), referring to FIG. 1, the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30. As will be appreciated by one skilled in the art, the conversion of DC power to AC power is substantially performed by operating (i.e., repeatedly switching) the transistors within the inverter 24 at an operating (or switching) frequency, such as, for example, 12 kilohertz (kHz).

Referring to FIG. 2, generally, the controller 36 produces a Pulse Width Modulation (PWM) signal for controlling the switching action of the inverter 24. The inverter 24 then converts the PWM signal to a modulated voltage waveform for operating the motor 30. The inverter control system 34 of FIG. 2 consists of multiple operations during normal, or forward, operation including, but not limited to, receiving a torque command, converting the torque command to current commands based on present speed and available voltage, and performing regulation on such current commands. The output of the current regulator (not shown) is the output voltage needed to produce the requested currents. The PWM modulator 38 and the gate driver 39 generate the necessary gate pulses (or duty cycles) which are sent to the inverter 24 to control the electric motor 30 to the desired speed and/or torque. Additional considerations may be employed by the forward control path such as system temperatures, limitations, and additional communications or feedbacks to the overall system control in terms of operating status and availability.

According to one aspect of the present invention, as part of a feedback control loop, the current flowing through the windings 44, 46, and 48 is monitored. The winding currents (and/or signals generated to represent the winding currents) each have an oscillating component and an offset component. The oscillating component corresponds to the operating frequency of the inverter, and the offset component is a result of, for example, zero current offset. The offset component is isolated, or filtered, from the winding current and used to control the operation of the electric motor 30.

Figure 4:
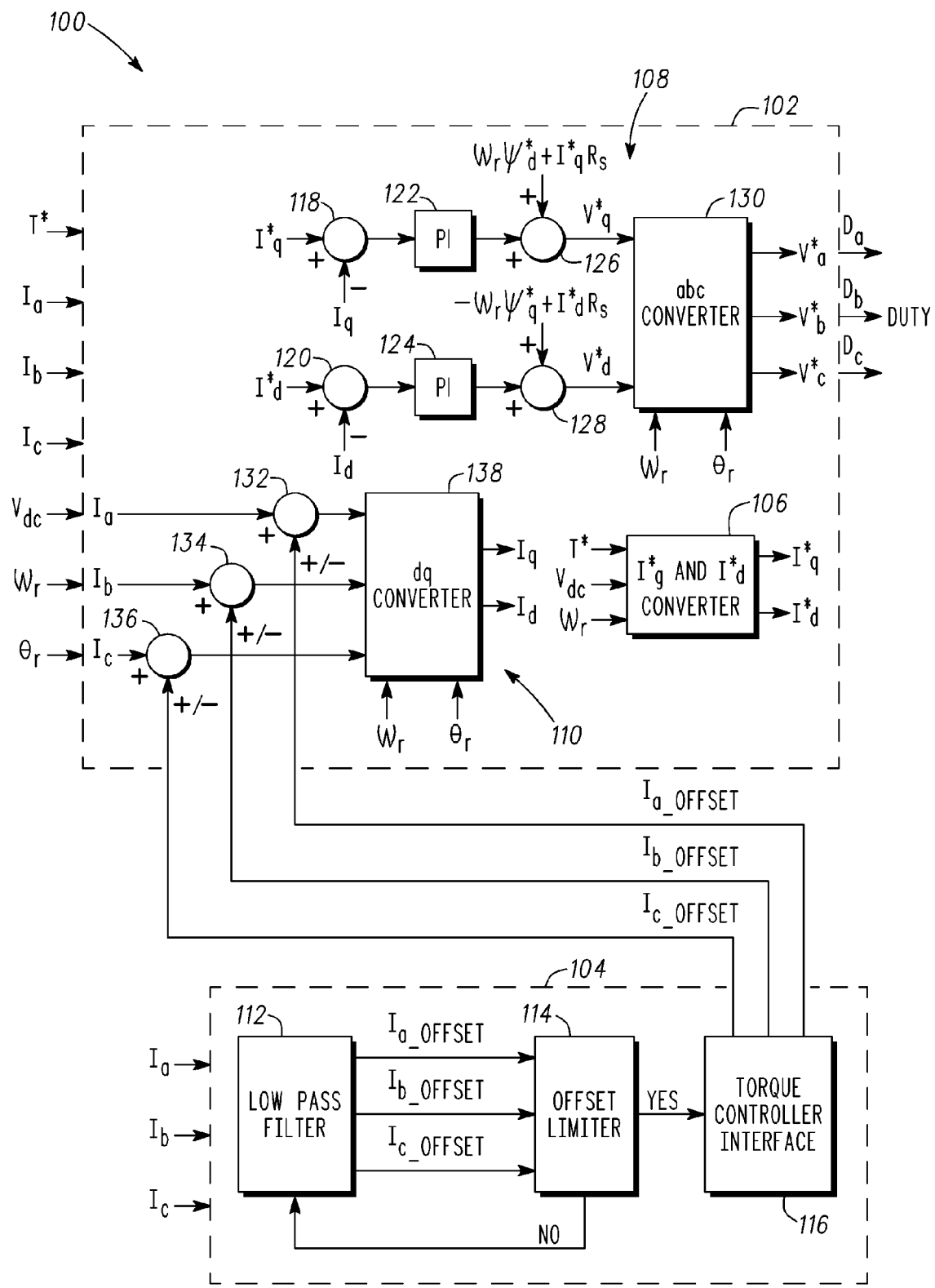
FIG. 4 is a combination block diagram and flow chart illustrating a system and/or method for controlling a motor according to one embodiment of the present invention.

FIG. 4 illustrates a motor control system (and/or method) 100, according to one embodiment of the present invention. The control system 100 includes a torque controller 102 and an offset current detection loop 104. The torque controller 102 includes a current command block 106, current control loop 108, and a current monitor 110. The offset current detection loop 104 includes a low pass filter 112, an offset current limiter 114, and a torque controller interface 116. As will be appreciated by one skilled in the art, in one embodiment, the control system 100 may be implemented within the electronic control system 18 (i.e., in the form of instructions stored on a computer-readable medium or "software"), particularly an inverter control module within the electronic control system 18. However, in other embodiments, portions of the control system 100 may be implemented as hardware, such as circuitry utilizing discrete electronic components.

As shown, the torque controller 102 receives as input (i.e., from various other subsystems and sensors in the automobile 10) a torque command (T*), winding currents ($I_a$, $I_b$, $I_c$), an available voltage from the voltage source ($V_{dc}$), the angular speed of the motor ($\omega_r$) (or of the rotor within the motor), and angular position of the motor ($\theta_r$).

Within the torque controller 102, the torque command, the available voltage, and the angular speed of the motor are sent to the current command block 106. The current command block 106 uses, for example, a look-up table stored on a computer-readable medium within the electronic control system to generate commanded synchronous frame currents ($I^*_q$, $I^*_d$), as will be appreciated by one skilled in the art. The synchronous frame currents are then sent to the current control loop 108.

Within the current control loop 108, the synchronous frame currents are received by respective summation circuits (or summers) 118 and 120, each of which subtracts a sensed synchronous frame current ($I_q$, $I_d$) from the respective commanded current. The differences between the commanded and sensed synchronous frame currents (i.e., the errors) are sent to proportional-integral (PI) controllers 122 and 124.

As will be appreciated by one skilled in the art, the PI controllers 122 and 124 are feedback loop components that take a measured value (or output) from a process or other apparatus and compare it with a set, or reference, value. The difference (or "error" signal) is then used to adjust an input to the process in order to bring the output to its desired reference value. The PI controllers 122 and 124 may include a proportional and an integral term. The proportional term is used to account for the "immediate" or present error, which is multiplied by a constant. The integral term integrates the error over a period of time and multiplies the integrated sum by another constant.

As such, the PI controllers 122 and 124 receive the present current error from summation circuits 118 and 120 and generate signals that are representative of a combination of the present current error and the current error over a period of time. The output of the PI controllers 122 and 124 are sent to summation circuits 126 and 128, respectively, which also receive, in one embodiment, decoupling voltage/feedforward terms ($\omega_r\psi^*_d + I^*_q R_s$, $-\omega_r\psi^*_q + I^*_d R_s$). The summation circuits 126 and 128 add the outputs of PI controllers 122 and 124 to the respective decoupling voltages and send the outputs, which are commanded synchronous frame voltages ($V^*_q$, $V^*_d$) to a three-phase (i.e., abc) reference frame conversion block 130. As is commonly understood, the reference frame conversion block 130 also receives the angular speed and position of the motor 30 and generates commanded stationary voltages ($V^*_a$, $V^*_b$, $V^*_c$), each of which corresponds to one of the three phases of the motor 30.

Although not explicitly shown, the commanded stationary voltages are then converted into duty cycles ($D_a$, $D_b$, $D_c$) by, for example, the inverter control module within the electronic control system 18. The duty cycles are then used to operate the switches 52-62 within the inverter 24 to operate the motor 30.

Still referring to FIG. 4, the current monitor 110 includes summation circuits 132, 134, and 136 and a two-phase (i.e, dq) reference frame conversion block 138. Each of the summation circuits 132, 134, and 136 receives a sensed winding current ($I_a$, $I_b$, $I_c$) from, for example, a respective one of the current sensors 66 (FIG. 3) and an offset current ($I_{a\_offset}$, $I_{b\_offset}$, $I_{c\_offset}$) from the offset current detection loop 104. The reference frame conversion block 138 receives the outputs of summation circuits 132, 134, and 136, the angular speed, and the angular position of the motor 30 and generates the sensed synchronous frame currents ($I_q$, $I_d$) used by the current control loop 108 as described above.

The offset current detection loop 104 receives the sensed winding currents ($I_a$, $I_b$, $I_c$) as input. The sensed winding currents are fed through the low pass filter 112. According to one aspect of the present invention, the sensed winding currents ($I_a$, $I_b$, $I_c$), and/or the signals representative of the windings currents as generated by the current sensors 66, each include an oscillating component (e.g., similar to the fundamental frequency of the motor 30) and an "offset" or static or non-oscillating (or low frequency) component (i.e., a zero current offset). As will be appreciated by one skilled in the art, the offset component may essentially have no frequency, or a zero frequency (i.e., be a DC quantity), and be the result of various phenomena, such as offset/error from the current sensors 66, circuit interfaces, power supply, and analog-to-digital channel interfaces, as well as any external noise or interference.

As such, when the sensed winding currents are filtered with the low pass filter 112, the offset components or currents ($I_{a\_offset}$, $I_{b\_offset}$, $I_{c\_offset}$) are isolated from the winding currents as long as the frequency of the oscillating components of the winding currents are above the cut-off frequency for the low pass filter. In one embodiment, the offset components introduced by the current sensor interface are detected using $$I_{filtered}(n+1) = I_{filtered}(n) + \frac{T_S}{\tau_S}(I_{in}(n) - I_{filtered}(n)), \quad (1)$$

where $T_s$ is the sampling time and $\tau_s$ is the filter time constant.

In one embodiment, the cut-off frequency of the low pass filter 112 may be 0.5 Hz. Also, the control system 100 may be configured such that the offset current detection loop 104 is not used (and/or disabled) when the fundamental motor frequency falls below a predetermined frequency threshold which may be higher than the cut-off frequency of the low pass filter 112, such as 1.0 Hz. It should be noted that, as mentioned above, in other embodiments the low pass filter 112 may be implemented as hardware, such as a series of discrete passive electronic components (e.g., resistors and capacitors) within the electronic control system 18.

Still referring to FIG. 4, the offset components are then sent to the offset current limiter 114. The offset current limiter 114 compares the offset components to a predetermined current threshold (e.g., 15 A). If any of the offset components are greater than or equal to (i.e., not less than) the current threshold (or not within "expected worst case limits"), it is assumed that the sensed current windings (and/or the representative signals) are not reliable, the offset components are not sent to the controller interface 116, and the offset current detection loop 104 returns to the low pass filter 112 for the next cycle. In some embodiments, a higher level system is notified that the offset detection system has detected a zero current offset that is outside of the expected range.

If the offset currents are within the expected worst case limits, the offset current detection loop 104 sends the offset currents to the torque controller 102 via the torque controller interface 116. As mentioned above, each of the offset currents is sent to a respective one of the summation circuits 132, 134, and 136, where it is subtracted from the associated winding current (and/or the signal representative of the winding current). As such, the outputs of the summation circuits 132, 134, and 136 more accurately represent the amount of current flowing through the windings as a result of the commanded currents, without interference from offset current. Thus, the accuracy of the sensed synchronous frame currents provided to the current control loop 108 is improved, as is the overall torque regulation of the torque controller 102.

Another advantage is that phase current imbalances may be reduced as well as torque oscillation and ripple. A further advantage is that because the offset current detection loop may be implemented as "software," any increases to the manufacturing costs of the automobile 10 are minimized.

Other embodiments may utilize the method and system described above in implementations other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an electric motor comprising at least one winding, the method comprising:
    monitoring a winding current flowing through the at least one winding, the winding current having an oscillating component and an offset component;
    isolating the offset component of the winding current from the oscillating component of the winding current; and
    controlling the electric motor based on the offset component of the winding current only if each of the offset components is less than a predetermined current threshold.

2. The method of claim 1, wherein the winding current is a sum of the oscillating component and the offset component.

3. The method of claim 2, wherein the controlling of the electric motor based on the offset component of the winding current comprises subtracting the offset component from the winding current to determine the oscillating component.

4. The method of claim 1, wherein the oscillating component of the winding current has an operating frequency.

5. The method of claim 4, wherein the isolating of the offset component of the winding current from the oscillating component of the winding current is performed with a low pass filter having a cut off frequency.

6. The method of claim 5, wherein the controlling of the electric motor based on the offset component of the winding current only occurs if the operating frequency of the oscillating component of the winding current is above a predetermined frequency threshold.

7. The method of claim 6, wherein the predetermined frequency threshold is greater than the cut off frequency of the low pass filter.

8. The method of claim 7, wherein the controlling of the electric motor based on the offset component of the winding current further comprises calculating a duty cycle for a power switching device electrically connected to the at least one winding.

9. The method of claim 8, wherein the monitoring of the winding current through the at least one winding is performed using a Hall Effect sensor.

10. A method for controlling an automotive electric motor comprising a plurality of windings, the method comprising:
- monitoring a plurality of winding currents, each of the plurality of winding currents flowing through a respective one of the plurality of windings;
- generating a plurality of winding current signals, each of the plurality of winding signals being representative of a respective one of the plurality of winding currents and being a sum of an oscillating component and an offset component;
- filtering the plurality of winding current signals to determine the offset component of each of the plurality of winding current signals; and
- controlling the automotive electric motor based on the offset components of the plurality of winding current signals only if each of the offset components is less than a predetermined current threshold.

11. The method of claim 10, wherein the controlling of the automotive electric motor comprises determining the oscillating components of the plurality of winding current signals by subtracting the offset component of each of the plurality of winding current signals from the respective one of the plurality of winding current signals.

12. The method of claim 11, wherein the oscillating component of each of the plurality of winding current signals has an operating frequency corresponding to a current frequency of the respective one of the plurality of winding currents, and wherein the filtering of the plurality of winding current signals is performed with at least one low pass filter having a cut off frequency.

13. The method of claim 12, wherein the controlling of the automotive electric motor based on the offset components of the plurality of winding current signals occurs only if the operating frequency of the oscillating components of each of the plurality of winding current signals is above a predetermined frequency threshold.

14. The method of claim 13, wherein the predetermined frequency threshold is greater than the cut off frequency of the at least one low pass filter.

15. An automotive propulsion system comprising:
- an electric motor comprising at least one winding;
- a direct current (DC) voltage supply coupled to the electric motor;
- a current sensor coupled to the at least one winding configured to generate a signal representative of a winding current flowing through the at least one winding;
- a power inverter comprising at least one power switching device coupled to the at least one winding and the DC voltage supply; and
- a processor in operable communication with the electric motor, the DC voltage supply, the current sensor, and the power inverter, the processor being configured to:
  - monitor the winding current flowing through the at least one winding, wherein the winding current has an oscillating component and an offset component;
  - isolate the offset component of the winding current from the oscillating component of the winding current; and
  - control the at least one power switching device based on the offset component of the winding current only if the offset component is less than a predetermined current threshold.

16. The automotive propulsion system of claim 15, wherein the winding current is a sum of the oscillating component and the offset component, and the processor is configured such that the controlling of the at least one power switching device based on the offset component of the winding current comprises subtracting the offset component from the winding current to determine the oscillating component.

17. The automotive propulsion system of claim 16, wherein the oscillating component of the winding current has an operating frequency, the isolating of the offset component of the winding current from the oscillating component of the winding current is performed with a low pass filter having a cut off frequency, and the processor is configured such that the controlling of the electric motor based on the offset component of the winding current only occurs if the operating frequency of the oscillating component of the winding current is above a predetermined frequency threshold, the predetermined frequency threshold being greater than the cut off frequency of the low pass filter.

18. The automotive propulsion system of claim 17, wherein the current sensor is a Hall Effect sensor.

* * * * *